US00RE39636E

(19) United States
(12) Reissued Patent
Brown

(10) Patent Number: US RE39,636 E
(45) Date of Reissued Patent: May 22, 2007

(54) AGRICULTURAL METHODS WITH SUPERHEATED STEAM

(76) Inventor: Claude Brown, 14281 Vintage Rd., Lodi, CA (US) 95240

(21) Appl. No.: 09/735,186
(22) Filed: Dec. 15, 2000

Related U.S. Patent Documents

Reissue of:
(64) Patent No.: 5,848,492
Issued: Dec. 15, 1998
Appl. No.: 08/958,073
Filed: Oct. 27, 1997

U.S. Applications:
(63) Continuation-in-part of application No. 08/642,534, filed on May 3, 1996, now Pat. No. 5,867,935.

(51) Int. Cl.
*A01M 15/00* (2006.01)
*A01G 13/00* (2006.01)

(52) U.S. Cl. ..... 47/1.44; 47/58.1 R
(58) Field of Classification Search ..... 47/1.44, 47/1.01 R, 58.1 R; 43/130
See application file for complete search history.

(56) References Cited

U.S. PATENT DOCUMENTS

| | | | | | |
|---|---|---|---|---|---|
| 1,727,995 | A | * | 9/1929 | Lechler | 43/130 |
| 1,948,537 | A | * | 2/1934 | Noack | 122/24 |
| 1,948,939 | A | * | 2/1934 | Noack | 122/476 |
| 2,132,658 | A | * | 10/1938 | Southcott | 122/476 |
| 2,272,190 | A | * | 2/1942 | Elliott | 111/121 |
| 2,304,409 | A | * | 12/1942 | Jeffords | 122/169 |
| 2,528,899 | A | * | 11/1950 | McLemore | 47/1.44 |
| 2,548,051 | A | * | 4/1951 | Peck | 126/271.2 R |
| 2,602,388 | A | * | 7/1952 | Elliott | 47/1.42 |
| 2,639,553 | A | * | 5/1953 | Russell | 47/58.1 R |
| 2,865,135 | A | * | 12/1958 | Gamboni et al. | 47/1.43 |
| 2,876,748 | A | * | 3/1959 | Nelken | 122/240.2 |
| 3,636,929 | A | * | 1/1972 | Sanders | 122/460 |
| 3,636,939 | A | * | 1/1972 | Sijbring | 126/271.2 R |
| 3,892,061 | A | * | 7/1975 | Whitley | 56/27.5 |
| 4,251,983 | A | * | 2/1981 | Burton | 56/330 |
| 4,418,652 | A | * | 12/1983 | Rees | 122/468 |
| 4,480,402 | A | * | 11/1984 | Hiyama et al. | 47/58.1 R |
| 5,189,832 | A | * | 3/1993 | Hoek et al. | 47/1.44 |
| 5,433,758 | A | * | 7/1995 | Thompson et al. | 47/58.1 R |
| 5,568,793 | A | * | 10/1996 | Ziegler | 122/460 |
| 5,575,111 | A | * | 11/1996 | Rajamannan | 47/58.1 R |
| 5,622,123 | A | * | 4/1997 | Rajamannan | 111/120 |
| 5,628,810 | A | * | 5/1997 | Dugast et al. | 71/28 |
| 5,682,707 | A | * | 11/1997 | Chastain | 47/1.44 |

FOREIGN PATENT DOCUMENTS

| | | | | |
|---|---|---|---|---|
| DE | 2738669 | | * | 9/1976 |
| DE | 3922022 | A | * | 1/1991 |
| FR | 2423132 | | * | 12/1979 |
| FR | 2752145 | A1 | * | 2/1998 |
| GB | 2030434 | | | 4/1980 |
| IT | 1188128 | B | * | 12/1987 |
| NZ | 240568 | | | 12/1994 |
| NZ | 264258 | | | 2/1996 |
| RU | 2002400 | C1 | * | 11/1993 |
| SU | 1012829 | | * | 4/1983 |
| SU | 1780676 | A1 | * | 12/1992 |
| WO | WO 00/22926 | | | 4/2000 |

OTHER PUBLICATIONS

Anonymous. 1992. Grape Pest Management. 2d. ed., Flaherty et al., eds., University of California, Division of Agricultural and Natural Resources, Publication 3343, pp. xi–xii and 290.*

Sass et al., Dubbels Taschenbuch fur den Maschinenbau, 1966, p. 37, paragraph d., New York (2 pages) (with accompanying English Translation, 2 pages).

* cited by examiner

*Primary Examiner*—Jeffrey L. Gellner
(74) *Attorney, Agent, or Firm*—Steven R. Vosen

(57) ABSTRACT

Methods for treating plants and fields in agricultural applications are provided by selective delivery of superheated steam. Particularly preferred applications include delivery adjacent to grape vine leaves in order to defoliate basal leaves and to kill localized insect pests, and by injecting superheated steam in strawberry beds prior to planting to kill nematodes. The superheated steam is delivered at temperatures in excess of about 250° F.

42 Claims, 6 Drawing Sheets

AGRICULTURAL METHODS WITH SUPERHEATED STEAM

Matter enclosed in heavy brackets [ ] appears in the original patent but forms no part of this reissue specification; matter printed in italics indicates the additions made by reissue.

This is a continuation-in-part of Ser. No. 08/642,534, filed May 3, 1996 [pending] *now U.S. Pat. No. 5,867,935.*

FIELD OF THE INVENTION

The present invention generally relates to superheated steam for agricultural uses, and more particularly relates to delivering superheated steam in the field in fumigating, weeding, defoliating, and drying applications where the superheated steam is selectively delivered above and/or below the soil such as with a portable apparatus.

BACKGROUND OF THE INVENTION

Selective defoliation of a field growing crop such as grape vines has long been known as a desirable practice. Thus, for example, U.S. Pat. 2,865,135, issued Dec. 23, 1958, inventors Gamboni et al. discloses a grape leaf stripping mechanism to strip the leaves from grape vines by a mechanical apparatus rather than manual defoliation. The apparatus disclosed by this patent uses a pair of heaters to effect the defoliation.

More recently, the University of California publication on Grape Pest Management (2nd Edition, 1992, publication 3343) notes that among the practices for disease control are the removal of basal leaves from vines approximately two weeks after bloom. This practice reduces Botrytis bunch rot and produces a superior wins grape in many North Coast vineyards, and has also been reported to reduce first-generation leaf hoppers. The publication notes that most leaf removal is presently done by hand, but that mechanical systems are being developed and used by several growers. (Supra, xi.)

Removal of basal leaves on grape vines also permits the grape clusters to hang free and allows light penetration for coloring and budwood development, and allows air and chemical spray penetration for reducing molds, moisture, and insect infestation. Leaf removal has proven to produce a better acid/sugar ratio in ripening berries, and thus results in better quality wines and/or juices.

Manual defoliation is, obviously, labor intensive and thus tends to be costly. In addition, manual defoliation when performed shortly after fruiting tends to bruise the very small berries in the fruit cluster. Further, manual defoliation leads supply to displace pests such as leaf hoppers to the adjacent, remaining leaves where they can continue to wreak their damage and subsequently can return to the fruit cluster.

The presently known mechanical means for defoliating are disadvantageous because those that blow air or pull a vacuum tend to damage the berries by bruising or removing the berries themselves.

Another problem area for cultivated fields and crop maintenance such as vineyards particularly in California are that typical soils contain nematodes that feed on roots, which reduce root efficiency. Nematode infestation of vineyards are manifested by reduced vigor and yield with a light yellowing of leaves because nematode-infected vine roots are unable to meet above-ground demands for nutrients and water.

Preplant fumigants such as methyl bromide profoundly affect nematodes, and current advice for preparing a new vineyard includes the application of a nematicide such as methyl bromide (Grape Pest Management, supra, p. 290). However, methyl bromide bas been implicated in harming the ozone layer. As a consequence, considerable environmental pressure has been building against its use. Nevertheless, in February 1996, the California Senate voted to delay a proposed ban on the ozone-depleting fumigant, methyl bromide, until the end of 1997. A reason for delaying the proposed ban was due to lack of effective alternatives for agriculture in soil pest control, particularly for crops such as strawberries.

On small scale soil treatments, nurseries have been able to use steam as a sterilant for minimizing fungal infections. Thus, bedding plant nurseries have been able to grow seedlings in steam sterilized soils. But such small scale soil treatments are not presently practical or possible for in the field use. Further the steam used is not a very efficient process, since it involves for example, temperatures close to 212° F.

SUMMARY OF THE INVENTION

Figure 1:
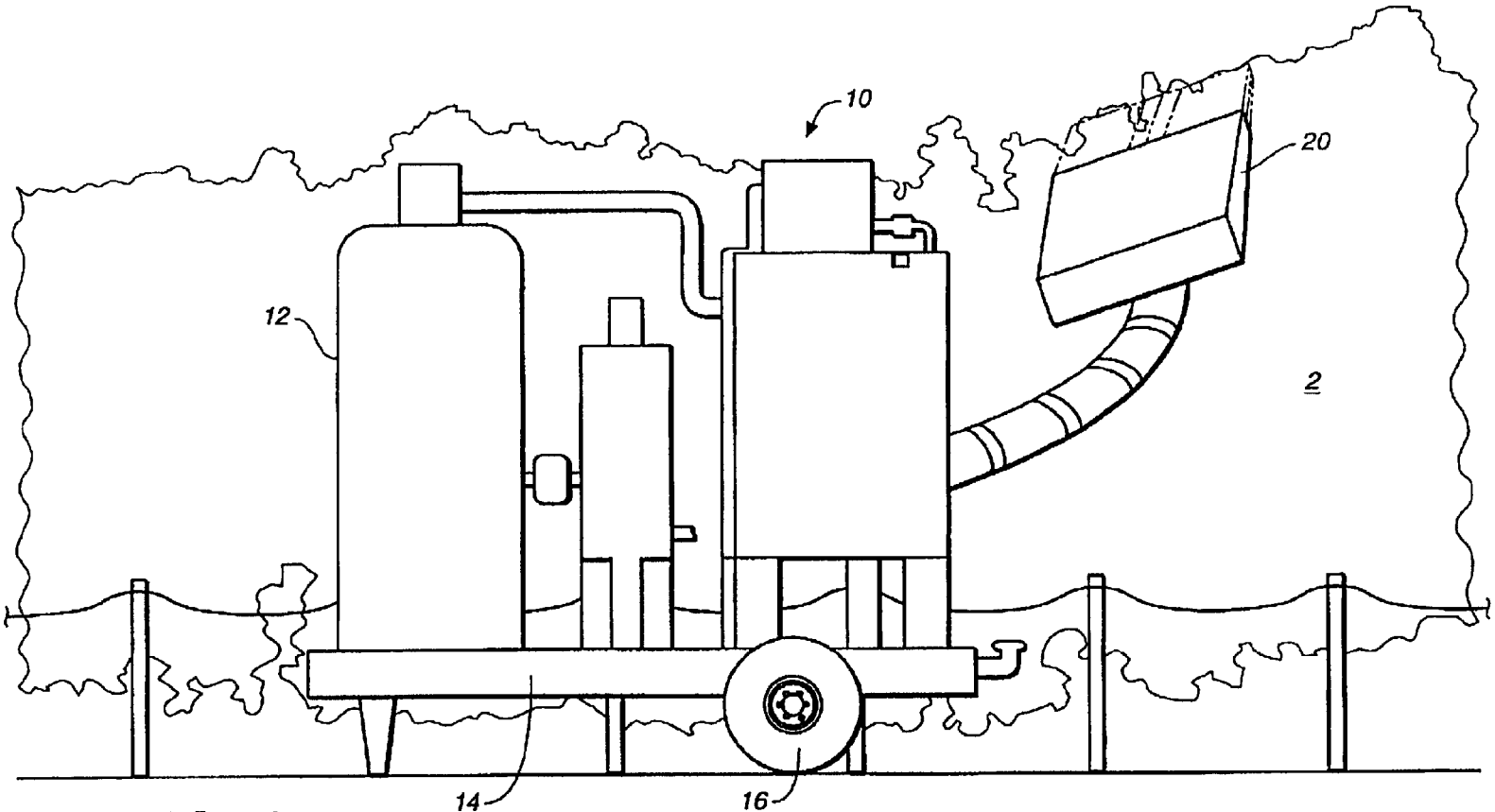
FIG. 1 shows a side view of a superheated steam delivering apparatus useful in practicing aspects of the invention.

It is an object of the present invention to provide in the field agricultural uses of superheated steam that may be selectively delivered for applications such as fumigation, weeding, defoliation, and drying. These objects are achievable through use of a portable apparatus capable of delivering superheated steam at selected locations to plants or soil in agricultural fields. Superheated steam may be delivered to trellised plants, such as, for example, grapes and berries, while delivery to soil is useful, for example, for a wide variety of plant cultures, including strawberry fields and vineyards.

In one aspect of the present invention, an agricultural method for in the field use comprises the selective delivery of sufficient superheated steam to soil in a field to kill undesired organisms. The undesired organisms can be insects, whether in adult or larval form, and worms, such as nematodes. The undesired organisms can also be weeds. The superheated steam is preferably delivered at a temperature above about 250° F., and can be delivered adjacent to the soil surface (above ground) or can be by penetrating the soil to deliver the superheated steam therein.

In another aspect of the present invention, a method for defoliating plants, preferably grape vines, is provided whereby superheated steam is delivered to basal leaves.

When treating grape vines, the superheated steam is preferably delivered adjacent to developing grape berries within a desired volume, or envelope. The desired envelope has a characteristic dimensional size within which the treating steam has a temperature range sufficient for defoliation, but which surprisingly does not damage the grape berries themselves.

In yet another aspect of the present invention, a method for treating raisin grapes or prune plums is provided to decrease time of drying on the cane or tree prior to harvest.

Other objects and advantages of the invention will become apparent upon reading the detailed description and as set out in the appended claims.

Detailed Description of the Preferred Embodiment

Broadly, the invention involves the selective delivery of superheated steam for a variety of agricultural applications. This selective delivery of superheated steam has been made possible by a particularly preferred apparatus, which will the illustrated as the best mode contemplated for carrying out the present invention; however, other apparatus capable of generating superheated steam may be used so long as the superheated steam is delivered at the temperature or temperature ranges necessary for practicing aspects of the invention.

The preferred apparatus for use in practicing the invention includes a portable frame, a water reservoir mounted on the frame and defining an upstream end of a fluid passageway carried by the frame, a first chamber disposed along the fluid passageway downstream of the reservoir, which includes, a beater operable to convert water being flowed from the reservoir and through the chamber into steam, a second chamber disposed along the, fluid passageway and of a construction sufficient to receive steam at a first temperature range downstream of the first chamber and to heat the received steam to within a second (elevated) temperature range so that steam is superheated, and an outlet adapted to deliver a flow of superheated steam from the second chamber.

One particularly preferred application in accordance with the invention is to defoliate ;grape vines. Because the heat of superheat can be generally transformed into work without forming moisture, the use of superheated steam efficiently permits application of high temperature but relatively low velocity flows in the vicinity desired for such application, such as adjacent to developing grape berries without bruising or damaging the berries themselves, yet while accomplishing efficient defoliation. By contrast, were one to use steam that was not superheated, then the developing berries would be subjected to bruising and other damage. Further, normal (wet) steam cools rapidly so that were one to try to direct wet (not superheated) steam towards foliage, little or no leaf removal would be achieved.

The preferred apparatus for superheated steam delivery has a portable frame that is of sufficiently small dimensions and not overly heavy so as headily to be moved over a field of growing plants (where the agricultural application is to deliver superheated steam adjacent to leaves of above-ground plants, for example). Present day vineyards on the west coast of the United States typically grow grape vines on trellises (e.g. cordon trained grapes). Vine rows are frequently spaced about 8–12 feet apart in the United States (and more narrowly in Europe). Grape growers pull various apparatus down the vine roves by tractor during the growing season and at harvest. Thus, a preferred apparatus embodiment typically has the frame width designed to fit vineyard rows down to about 8 feet wide, which are analogous to the dimensions of frames used for grape gondolas and machine grape harvesters Preferred embodiments of the invention include a rail, or ski, extending from the frame and adjustably moveable against field growing plants in a manner analogous to a horizontal picking rail of grape harvester truck shakers, which move along the trellis and address the trunk and grape stakes below the cordon height level. A defoliation embodiment of the invention will first be described, followed by a description of some alternative embodiments, useful as for treating soft in accordance with the invention.

FIG. 1 illustrates a superheated steam delivery apparatus 10 as embodied in the invention being used, for example, to defoliate a vine 2, tree, shrub or the like. The apparatus 10 generally comprises a superheated steam delivery portion 12 mounted on a hitch or portable frame 14, wherein said frame engages the ground through wheels 16 or by other similar means such as track type treads. The frame 14 can be hitched with a tractor (not shown), for example, to move the superheated steam delivery portion along a row of foliage for superheated steam treatment purposes. Although as shown the superheated steam delivery portion 12 is mounted on a trailer, it shall be understood that such portion can be an integral part of a tractor, truck or moving vehicle. The portable frame 14 may also include a rail, or ski, (not illustrated) extending from the frame which can be adjustably moved against the field growing plants 2 of a construction and in a manner analogous to that known for the rails of grape harvesters.

The superheated steam delivery portion 12 of the apparatus 10 includes a means for selectively distributing superheated steam to a desired location, such as nozzle 20 which has a pattern of orifices through which the superheated steam is distributed and thus delivered to a particular plant for which treatment is desired. The nozzle is generally held a selected distance from the foliage 2 such that the foliage is exposed to the flow of the superheated stream. The characteristics of the superheated steam are important if optimum defoliation is desired while damage to the berries or other fruit avoided, but optimum characteristics of the superheated steam will vary and depend on the type of plant and the time of leaf growth to which treatment is being applied.

For example, if defoliation of grapevines is desired soon after berries are forming while the adjacent leaves are young and thus tender, it is preferable that the superheated steam flowing outwardly from the nozzle be delivered approximately 12 to 15 inches in height and within a temperature range of 250° F. to 500° F. at such height but at a flow less than 60 psi. This requires that the temperature of superheated steam be raised in the second chamber (a superheating steam generator) to higher than the 250° F. to 500° F. range of actual delivery. In order that the selective delivery of superheated steam to the desired location be at this range, the superheated steam emerging from the superheated steam generator 28 should be at a temperature of at least about 300° F., typically in a temperature range of from about 300° F. to about 800° F., and at a pressure range of about 5 PSI to about 60 PSI.

This technique of applying a flow of superheated steam having desired characteristics to a field of grapevines has many benefits. For instance, defoliating of basal leaves allows grape dusters to hang free so that developing fruits are free of wind damage and the bloom is not rubbed away. Leaf removal also allows more light penetration for coloring and budwood development. Leaf removal further facilitates penetration of air and chemical spray for reducing molds, moisture and insect infestation. Moreover, defoliating of leaves has resulted in producing better acid/sugar ration in ripening berries, thus resulting in better quality wines and juices.

Although the lust described apparatus is particularly useful for defoliation of basal leaves on grape vines, it can readily be used to direct superheated steam adjacent to the area where root stock has been grafted to the desired grape variety. Stray suckers or canes sometimes tend to grow from the root stock below the graft point, and the inventive apparatus can be used to remove these undesirable suckers by application of the superheated steam. The number, size and shape of distributing orifices in nozzle 20 thus will vary for such different uses.

Other applications include applying the superheated steam to the soil surface to kill undesired organisms such as weeds and to the upper layers of soil as it is turned over to fumigate the soil. In this application, the nozzle 20 will preferably be replaced by one or a plurality of tines, or knives in which orifices may be vertically aligned for superheated steam distribution. Particularly in the latter (or latter two) applications, one can admix another soil or weed treatment agent with the superheated steam, since many insecticides, fumigants, and the like are already applied in vapor form and thus can be combined, such as entrained, with the flow of superheated steam.

Figure 2:
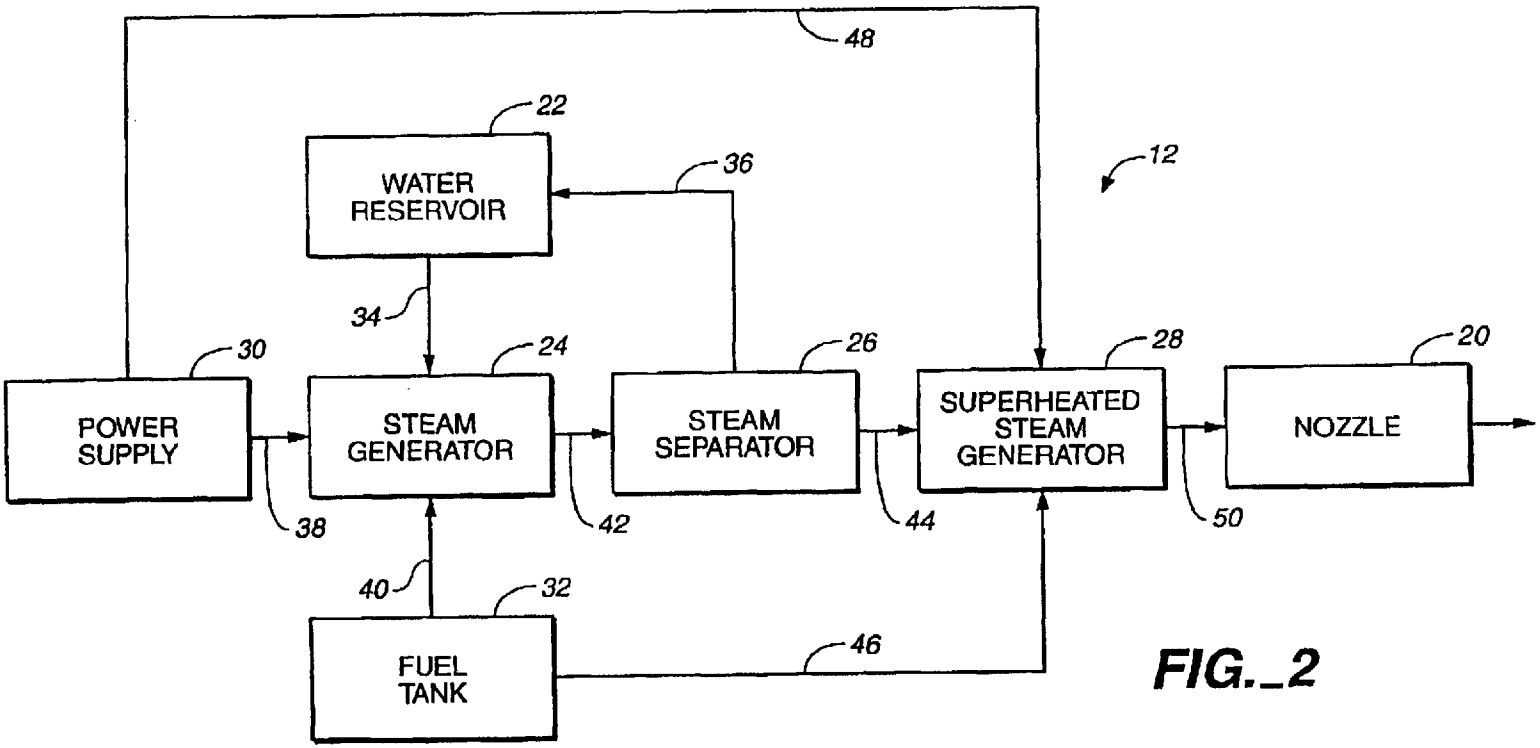
FIG. 2 shows a block diagram of the superheated steam delivery portion of the superheated steam delivery apparatus.

FIG. 2 represents a block diagram of the superheated steam delivery portion 12 of the superheated steam delivery apparatus 10. The superheated steam delivery portion 12 generally comprises a water reservoir 22, a steam generator 24, a steam separator 26, a superheated steam generator 28 and nozzle 20. The superheated steam delivery portion 12 also includes an electrical power supply 30 and a fuel tank 32 for supplying the necessary power to run the various components of the superheated steam delivery portion 12.

The superheated steam generating process begins at the water reservoir 22 which holds the water supply necessary to generate the: required quantity of superheated steam for treating the foliage 2. The water reservoir should have a capacity to produce sufficient superheated stream so that a desired portion of a field of plants is superheated steam treated while maintaining portability. In a preferred embodiment, for example, the water reservoir 22 has the capacity to hold 300 gallons of water, which permits treatment of about 1–4 acres per hour when the apparatus is moved at a rate of about 1–2 miles per hour through rows about 12 feet wide.

In the first step of the superheated steam generating, process, water along line 34 is pumped into the steam generator 24 so that a sufficient amount of steam is produced at the output of the steam generator 24 The rate of flow of water from the water reservoir 22 to the steam generator 24 should be sufficient in order for the steam generator 24 to continuously produce steam at its output without coming to a dry state. In the preferred embodiment, for example, water from the water reservoir 22 is pumped at about a rate of 45 gallons per hour (gph) to the steam generator 24. This rate results in the steam generator 24 continuously converting about 33 gph out of the 45 gph of water into steam. Of the 12 gph surplus water, about 11 gph is recycled back to the water reservoir 22 along line 36 so that an efficient use of water results.

As will be discussed more in detail later, the steam generator 24 performs a heat exchange process upon the incoming water so that steam is generated at its output. Briefly, the steam generator 24 receives fuel from the fuel tank along line 40 and combusts it with pressurized air to form a hot gas, mixture. The steam generator 24 also receives electrical power from the power supply 30 along line 38 in order to run an air blower. The air blower forces the hot gas mixture to flow within the steam generator thus exposing the water therein to the heat from the continuously flowing hot gas mixture. As a result, steam is generated at the output of the steam generator. In the preferred embodiment, steam at the superheated steam generator output is at a temperature of about 300° F. to 700° F. (or higher) and at a pressure of about 5 to 60 PSI.

Although in the preferred embodiment the vapor produced at the output of the steam generator 24 is at a relatively high temperature, typically about 80 percent of it is steam and about 20 percent is water droplets by weight. It is preferred to remove most of the water droplets before the vapor undergoes a superheating steam process. Hence, the vapor from the steam generator output is fed to the steam separator 26 along line 42. Water droplet removal is preferred because one can more efficiently heat the steam without using energy to vaporize the water droplets. Although removal of the water droplets from the vapor flowing from the steam generator 24 is preferred, it shall be understood that such removal is not necessary and that the vapor from the steam generator can be directly fed into the superheated steam generator 28. As will be explained in more detail later, the steam separator 26 preferably uses a centrifugal and condensation process to remove most, if not all, of the water droplets from the vapor flowing from the steam generator 24 which results in a high quality saturated steam vapor at the steam separator output. Most of the water droplets removed from the vapor is recycled back to the water reservoir 22 along line 36 so that an efficient use of the water supply is achieved.

The steam at the output of the steam separator 36 is thereafter fed to the superheated steam generator 28 along line 44 so that superheated steam is produced at the output thereof. The superheated steam generator performs essentially the same heat exchange process as the steam generator 24 does, but typically on a smaller scale. Briefly, the superheated steam generator receives fuel from the fuel tank 32 along line 46 and combines it with air to form a hot gas mixture. The superheated steam generator 28 also receives electrical power from the power supply 30 along line 48 to run an air blower. The air blower forces the hot gas mixture to flow within the superheated steam generator so that the low moisture (dry) steam therein is exposed to the heat of the continuously flowing hot gas mixture. As a result, superheated steam is produced at the output of the superheated steam generator 28. Thus, in the preferred embodiment, the superheated steam at the outlet of the superheated steam generator 28 is at a temperature of about 800° F. and at a pressure of about 50 PSI.

The superheated steam at the output of the superheated steam generator is subsequently fed to the nozzle 20 along line 50 so that the superheated steam can be selectively applied to the plant for treatment. The nozzle receives the superheated steam from the superheated steam generator 20 and directs, or distributes, it such that the flowing superheated steam from the orifices of the nozzle 20 has a desired envelope shape. As will be understood, actual patterns of distribution and nozzle sizes and shapes will vary depending upon the desired applications. In a preferred embodiment for vine defoliation, the superheated steam flowing outwardly from the outlet nozzle 20 may provide a vertical or horizontal envelope of approximately 12 to 15 inches in height and within a temperature range of about 250° F. to 500° F. at such height. It has been found that such characteristics obtain optimum defoliation of grapevines, at least in the vineyards located in the Northern part of California. It shall be understood that the optimum envelope and characteristics of the outwardly flowing superheated steam will depend on the particular type of foliage being treated.

Figure 3:
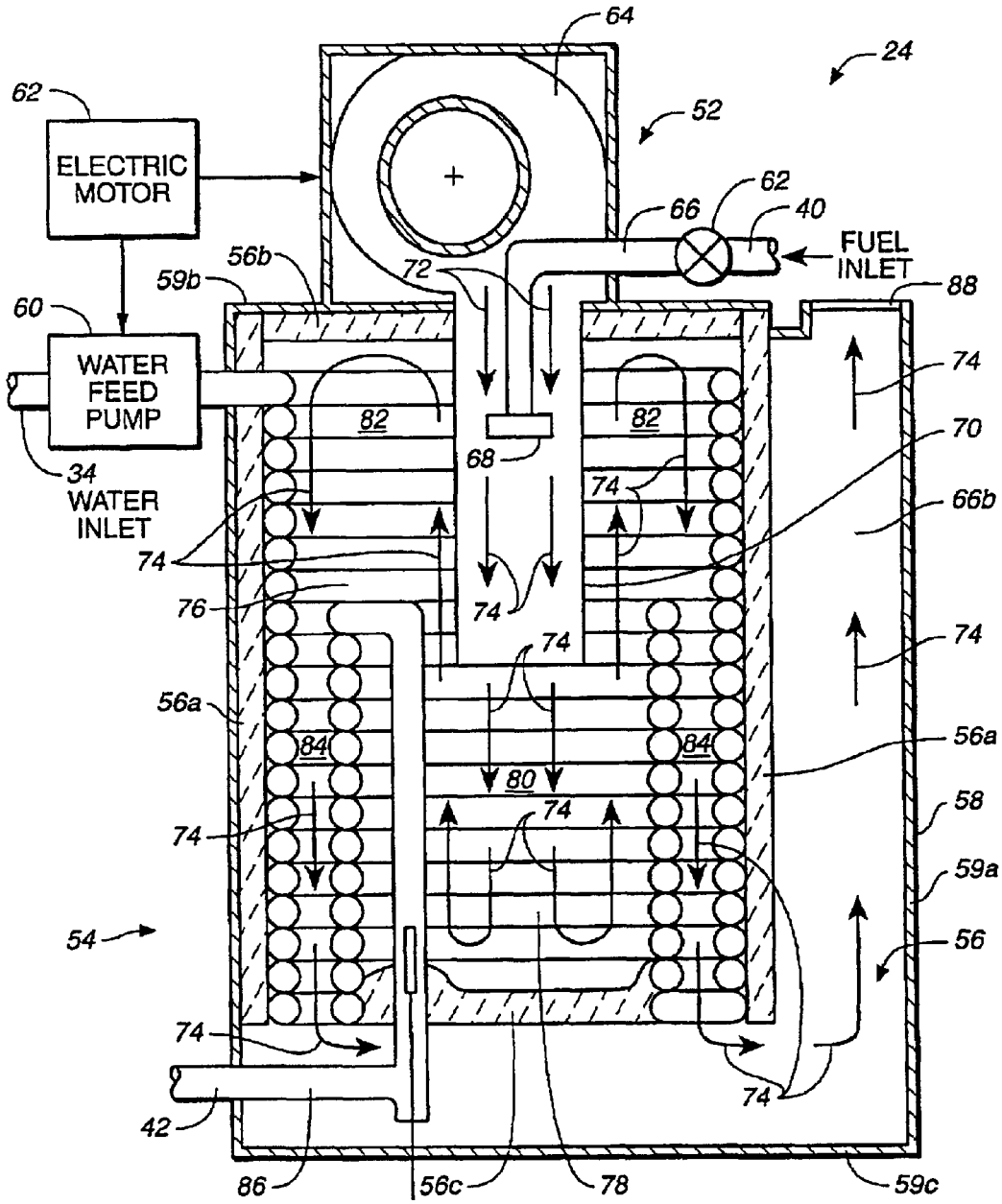
FIG. 3 shows a cross-sectional view of a steam generator.

Referring now to FIG. 3, a cross-sectional view of the steam generator 24 is shown. The steam generator 24 generally operates as a heat exchanger whereupon incoming water from the water reservoir 22 is continuously exposed to the heat of a hot gas mixture flow to convert the water into steam. The steam generator 24 can generally be divided into three portions: a burner portico 52, a heat exchanging portion 54 and an exhaust portion 56. A cylindrical metal housing 58, preferably made from a heavy gauge corrosion resistant aluminized steel and having a side wall 59a, a top wall 59b and a bottom wall 59c, encases the heat exchanging portion 54 and the exhaust portion 56. The burner portion 52 sits over the top wall 59b of the metal housing 58. The steam generator 24 further includes an external pump 60 for pumping in water from the water reservoir 22 which is delivered along; flowline 34 and also includes an electric motor 62 for driving the pump 60 and for driving a component of the burner 52. Preferably, the pump 60 is a positive displacement multi-cylinder pump.

The burner portion 52 is the portion of the steam generator 24 which produces the hot gas mixture needed for the heat exchanging process. It generally comprises an air blower 64, a fuel inlet pipe: 66, a burner head 68 and an elongated fire tube 70. The air blower 64 is coupled to the electric motor 62 by way of a drive train (not shown) and drives the blower such that pressurized air 72 is forced downward towards the fire tube 70. The fuel inlet pipe 66 is coupled to a valve 62 which selectively allows fuel to flow from flowline 40 towards the burner head 68 byway of the fuel inlet pipe 66. The burner head 68, which is situated within the elongated fire tube 70, ignites the flowing fuel using the pressurized air 72 to form a downward-flowing, hot gas mixture 74. The hot gas mixture 74 is forced downward into the elongated fire tube 70 for complete combustion. The elongated fire tube 74 extends coaxially into the metal housing 58 by way of an aperture in the top wall 59b.

The heat exchanging portion 54 is the portion of the steam generator 24 where most, if not all, of the heat exchanging process occurs. The heat exchanging portion 54 generally comprises a pair of concentric spirally wound pipes, i.e. an outer spirally wound pipe 76 and an inner spirally wound pipe 78. Preferably, the pipes are ¼ inch IPS schedule 80 pipes. The outer spirally wound pipe 76 preferably comprises 85 feet of pipe and measures 14 inches in outside diameter and 35 inches in length after coiling. The inner spirally wound pipe 78 preferably comprises 45 feet of pipe and measures 11 inches in outside diameter and 18 inches in length after coiling. The outer and inner pipes 76 and 78 are joined at the bottom of the heat exchanging portion 54, and in the preferred embodiment, the outer and inner wound pipes form a continuous single pipe that has been serpentined to form the outer and inner spirally wound pipes 76 and 78, and has a total length of 1.30 linear feet.

The heat exchanging portion 54 further includes outer, top and bottom ceramic refractorics 56a–56c which generally encase the outer and inner spirally wound pipes 76 and 78 and insulates the heat exchanging portion 54 from cooler ambient temperatures. The outer ceramic refractory 56a is cylindrical in shape, concentric with the outer and inner spirally wound pipes and snugly covers the outer surface of the outer spirally wound pipe 76. The outer ceramic refractory's cylindrical shape is preferably smaller in diameter and in height than the metal housing 58, and is mounted generally near the upper portion of the housing and tangentially along a portion of the inner surface of the side wall 59a. The top ceramic refractory 56b is a circular disk in shape with a centrally located aperture extending therethrough and situated between the top coil of the outer spirally wound pipe 76 and the top wall 59b of the metal housing 58. The aperture of the top ceramic refractory is generally concentric with the aperture of the top wall 59b, wherein the fire tube 70 extends therethrough. The bottom ceramic refractory 56c is generally a circular disk in shape and is joined to the bottom two coils of the inner spirally wound pipe 78, thus sealing off the lower end of the inner coil 78. Such a construction results in three heat exchanging compartments within the heat exchanging portion 54: a lower compartment 80 defined by the cylindrical space within the inner spirally wound pipe 78 and sealed at the lower end by the bottom ceramic refractory 56c; an upper compartment 82 defined as the space between the upper spirally wound pipe 76 and the fire tube 70 and extending from the top ceramic refractory 56b to the top of the inner spirally wound pipe 78; and a corridor compartment 84 defined as the space between the outer and inner spirally wound pipes 76 and 78.

The outer spirally wound pipe 64 is fluidly coupled to the pump 60 at the top coil thereof, whereby water from the water reservoir 22 is pumped into the steam generator 24 initially into the outer spirally wound pipe 78. The outer spirally wound pipe 64 is also fluidly coupled to the inner spirally wound pipe 78 at the bottom coil of both pipes 76 and 78. An outlet pipe 86 is fluidly coupled to the inner spirally wound pipe 78 at the top coil thereof and extends downward within the lower compartment 80 through an aperture within the lower ceramic refractory 56c and radially outward within the exhaust portion 56 and exits the metal housing 58 through an aperture into flowline 42. In the preferred embodiment, the outlet pipe 86 is also part of the continuous wound pipe that makes up the outer and inner spirally wound pipes 76 and 78.

The exhaust portion 56 of the steam generator 24 is generally a duct for allowing the cooled hot gas mixture 74 exiting the heat exchanging portion 54 to flow out of the steam generator 54 to the atmosphere. The exhaust portion 56 generally comprises the space between the heat exchanging portion 54 and the bottom and side walls 59c and 59b of the metal housing 58. Thus, exhaust gas flowing out of the bottom of the heat exchanging portion 54 flows into the exhaust portion in the space between the heat exchanging portion 54 and the bottom wall 59c of the metal housing 58, and then subsequently flows upwardly in the space between the heat exchanging portion 54 and the side wall 59a of the metal housing 58. The exhaust gas mixture 74 thereafter exits the steam generator 24 through aperture 88 at the top wall 59b of the metal housing 58.

In operation, the steam generator's pump 60 continuously delivers water from the water reservoir 22 into the steam generator 54 initially by way of the outer spirally wound pipe 76. At the same time, fuel is delivered to the burner head 68 from the fuel tank 32 by way of flowline 40, valve 62 and fuel inlet line 66. The burner head 68 ignites the fuel using the pressurized air 72 from the air blower 64 and forms a downward-flowing hot gas mixture 74. Combustion of the hot gas mixture 74 occurs while the gas 74 is flowing downward through the fire tube 70. The hot gas mixture 74 subsequently exits the fire tube 70 and flows into the heat exchanging portion 54; and specifically, flows initially into the inner compartment 80, wherein heat from the hot gas mixture 74 exchanges with the fluid flowing through the inner spirally wound pipe 78. The flowing hot gas mixture 74 thereafter encounters the lower ceramic refractory 56c and changes direction flowing upwardly into the upper compartment 82, wherein heat from the hot gas mixture 74 exchanges with the fluid flowing through the outer spirally wound pipe 76. The flowing hot gas mixture 74 next encounters the upper ceramic refractory 56b and changes direction flowing downward towards the corridor compartment 84, wherein the heat from the hot gas mixture 74 exchanges with the fluid flouring through the outer and inner spirally wound pipes 76 and 78. Thereafter, the flowing hot gas mixture 74 flows out of the heat exchanging portion at the lower end of the corridor compartment 84 and into the exhaust portion 56 of the steam generator 24, whereby the gas mixture subsequently exits the steam generator 24 as waste.

The steam generator 24 is enclosed so that the hot gas mixture 74 is under pressure and forced at relatively high velocity past the pipe coil surface, therefore maximizing the heat exchanging process. Of the 35.75 square feet of coiled pipe surface in the complete coil, only 24 square feet of pipe surface provides the actual heat exchange. The remaining 11.75 feet of surface are on the outside of the outer spirally wound pipe and are not in contact with the hot gas mixture. As a result, the heat exchange process typically delivers a vapor to the flowline comprising of 80 percent steam and 20 percent water droplets by weight.

Figure 4:
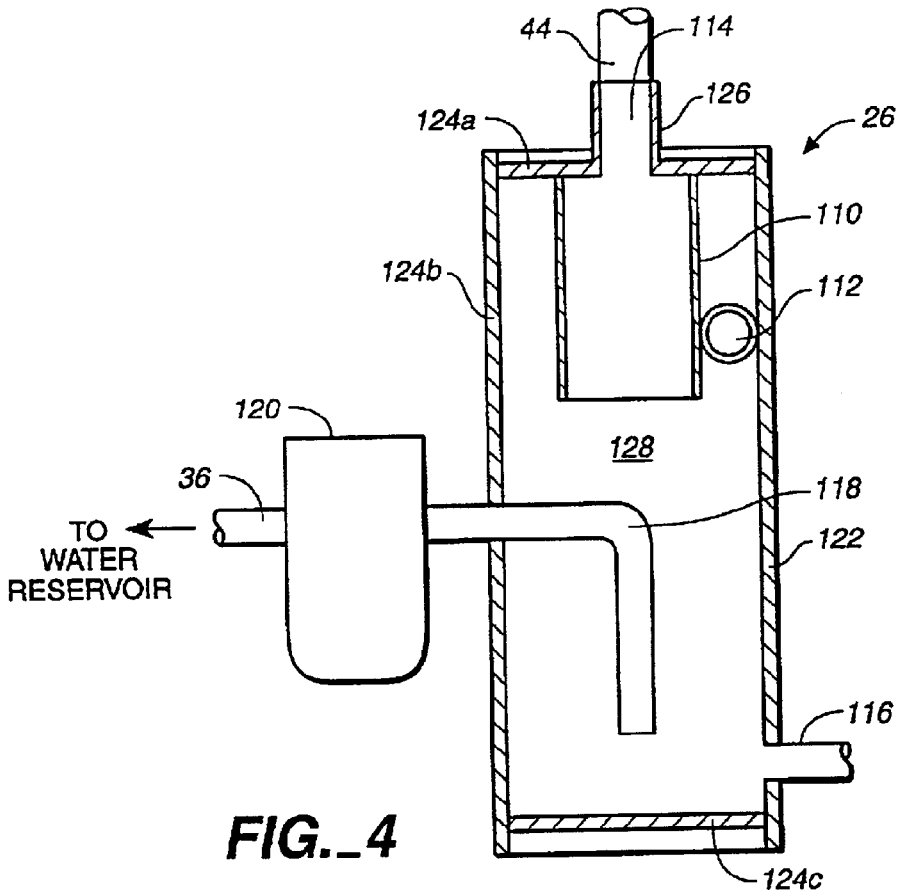
FIG. 4 shows a cross-sectional view of a steam separator.
Figure 5:
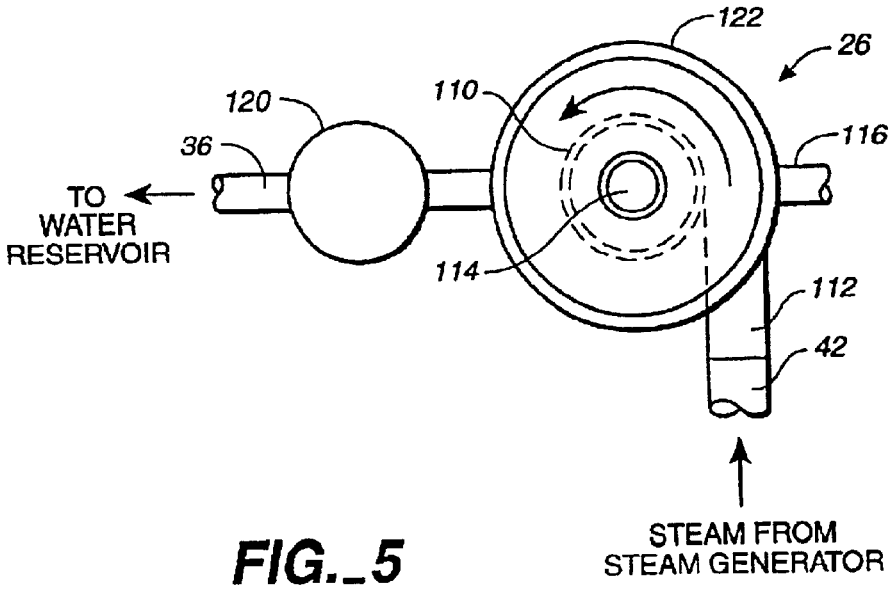
FIG. 5 shows a top view of the steam separator shown in FIG. 4.

FIGS. 4 and 5 illustrate a steam separator 26 for removing the undesired water droplets and for delivering steam substantially free of unvaporizcd water to the superheated steam generator 28. The steam separator 26 preferably operates to remove the water droplets from the vapor produced by the steam generator 24 by a centrifugal separating method. Thus, the steam generator 26 may comprise a metal housing 122 having a top wall 124a, a side wall 124b and a bottom wall 124c, and whose boundaries define a chamber 128 within the metal housing 122. The top wall 124a has a centrally located aperture 114 and a cylindrical outlet stack 124 extending vertically and outwardly therefrom and being concentric with the aperture 114. A vertical insulated separating cylinder 110 having; an opened top and bottom is mounted to the inner surface of the top wall 124a and preferably situated such that its longitudinal axis is coaxial with that of the outlet stack 126.

The steam separator 26, further has an inlet tube 112 extending outwardly from the metal housing 122 to flowline 42, wherein steam from the steam generator 24 is brought into the steam separator 26 by way of flowline 24 and inlet tube 112. The inlet tube 112 also extends inward into the chamber 128 and tangential to the side wall of the separating cylinder 110. Located near the bottom of the chamber 128 is a drain pipe 116 extending radially outward from the side wall 124b of the metal housing 122. The steam separator 26 further includes an external condensate trap 120 which is fluidly coupled to the chamber 128 by way of dip tube 118. The dip tube 118 extends vertically upward within the chamber lab from about 3 inches above the bottom wall 124c and then radially outward around the center of the chamber to the external condensate 120 by way of an aperture on the side wall 124b of the metal housing 122.

In operation, vapor and liquid from the steam generator 24 is delivered into the steam separator 26 by way of flowline 42 and inlet tube 112. These vapor and water droplets circulate around the cylindrical separator 110, whereupon the heavier droplets arc centrifugally separated from the steam to leave a high quality saturated steam. The saturated steam thereafter flows upwardly through the separating cylinder 110, through the outlet stack 126 and exits the steam separator 26 into flowline 44.

The superheated steam generator 28 is similar to the already described steam generator 24 in construction, but on a smaller scale. For example, a preferred embodiment apparatus has a total hourly heat release in a "steady state condition" (defined for the present purposes as superheated steam discharging from the superheated steam generator 28 at 800° F. while being supplied with about 240 lbs. of steam 50 PSI) of approximately 350,000 BTU/hour. Larger systems, of course are feasible. Of the 350,000 BTU/hour heat release, about 70% is provided by the steam generator 24 while about 30% is provided by the super-heated steam generator 28. Both burners of the respective steam generator 24 and superheated steam generator 28 include conventional temperature controllers based on the steam output desired so that the steam flow is regulated to be continuous during use of the apparatus. For example, the superheated steam generator 28 preferably has a high firing rate so as to produce in short time intervals the elevated temperature required, yet to be able to quickly respond when the maximum temperature level of the process is reached. This may be achieved by the use of a bi-metallic sensing unit operating a pilot valve which in turn controls a modulating diaphragm gas valve on the fuel supply line so as to provide quick response and to control the outlet temperatures at about ±15° F. To achieve such quick response, the available heat input of the superheated is about 1.5 times the heat required to operate at the defined "steady state condition." The thermostatic recontrolled pilot valve is preferably water-cooled by the feed water pump on the steam generator 24, and is isolated from the elevated temperatures adjacent to it. The superheated burner system will not fire unless an adequate supply of steam is being fed into the superheated coil through a flow responsive control system, which responds to a differential pressure valve on the coil inlet and transmits this difference in pressure to a control which opens or closes the circuit to the fuel valve on the burner.

Figure 6:
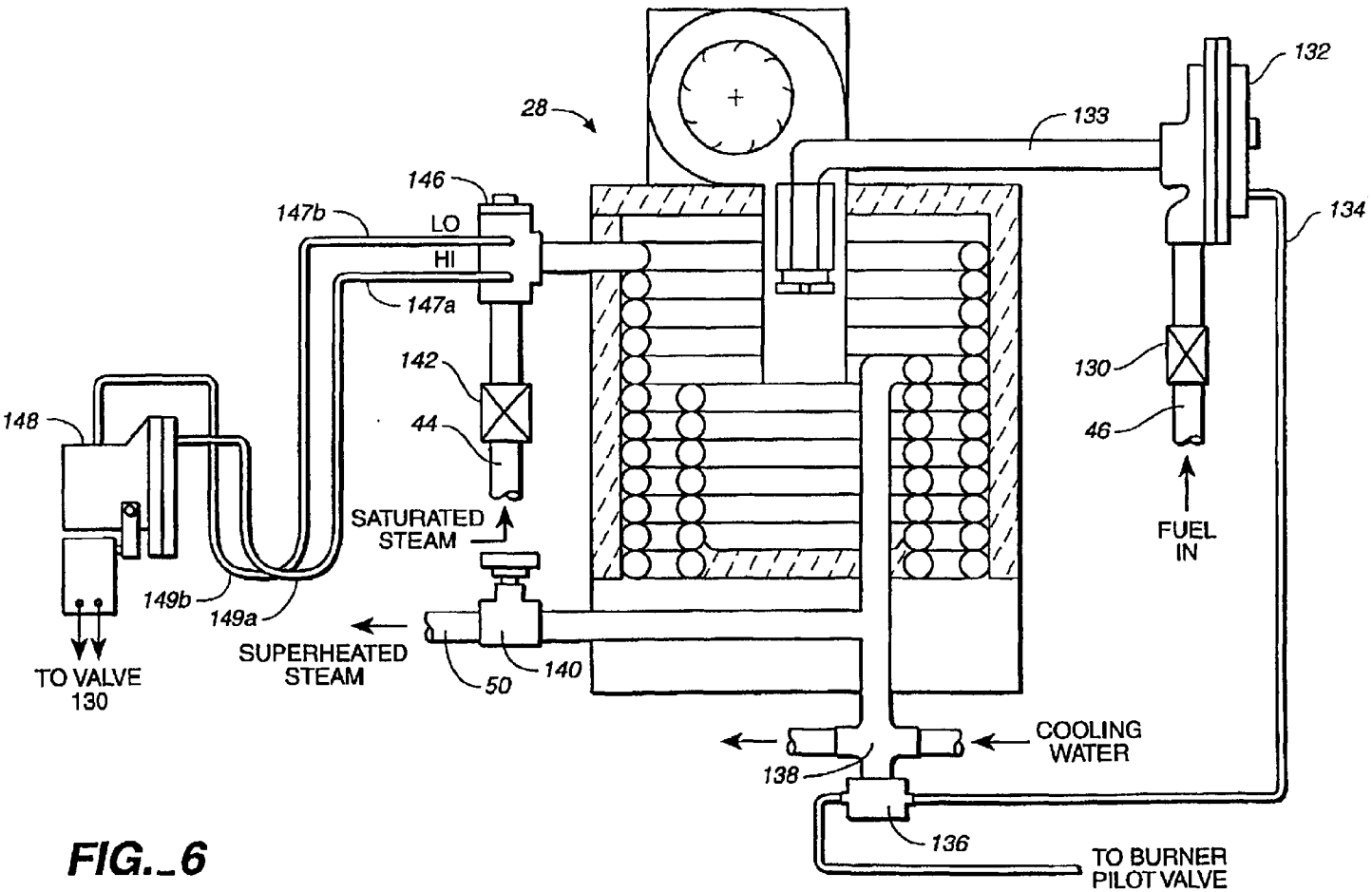
FIG. 6. shows a cross-sectional view of a superheated steam generator and control system.

Turning to FIG. 6, a cross-sectional view of the superheated steam generator 28 is shown in conjunction with a suitable superheated steam control system. In order for the superheated steam generator 28 to generate superheated steam at the "steady state condition," fuel along flowline 46 is initially fed into a modulating control valve 132 by way of a controllable valve 130. The modulating fuel valve 132 has a main fuel outlet coupled to flowline 133 which feeds fuel to the main burner of the superheated steam generator 28. The modulating valve also has a secondary fuel outlet coupled to flowline 134 which allows fuel to flow to the burners pilot ignition system (not shown). Pilot fuel line 134 is coupled to a thermostatic recontrolled pilot valve 136 which is cooled by flowing cooling water in T-flowline 138. The thermostatically controlled pilot valve 136 senses the temperature of the superheated steam exiting the superheated steam generator 28 and controls the modulating fuel valve 132 such that the superheated steam flowing out of the superheated steam generator 28 is maintained at "steady state condition" with a temperature variance of ±15° F. Such temperature can be verified by temperature indicator 140 which is situated within the path of flowline 50 at the superheated steam generator output.

With the modulating fuel valve 132 and the thermostatic recontrolled pilot valve 136 controlling the flow of fuel into the burner of the superheated steam generator 28 such that "steady state condition" is maintained, a continuous flow of saturated steam from the steam separator 26 is fed into the superheated steam generator 28 by way of flowline 44, valve 42 and differential pressure valve 146. The differential pressure valve 146 has an upstream and downstream outlet for sensing the pressure of the incoming saturated steam. Both the upstream and downstream outlets are coupled to a differential pressure responsive control 148 by way of flowlines 147a and 147b, respectively. Both flowlines 147a and 147b have water seal loops 149a and 149b to prevent any water droplets present in the saturated steam from flowing to the differential pressure responsive control 148. The pressure of the incoming saturated steam is sensed by the differential pressure responsive control 148, which in turn controls the controllable: valve 130 such that when the pressure of the incoming saturated steam is above a selected level the differential pressure responsive control 148 opens the controllable valve to allow fuel to flow to the modulating valve 132. On the other hand, when the pressure of the incoming saturated steam is less than the selected level, the differential pressure responsive control 148 shuts the controllable valve 130 so that fuel is prevented from flowing into modulating valve 132. Thus, only when the pressure of the incoming saturated steam is above the selected level, will the superheated steam generator 28 be operable.

Once the superheated steam exits the superheated steam generator 28, it flows into the nozzle 20 by way of flowline 50. The superheated steam so delivered typically will consist essentially of water vapor and air (e.g. is without combustion gases generated from the burner). However, insecticides, fumigants, drying aids, or the like can be combined with, or entrained in, the flow of superheated steam so as to efficiently treat the desired soil or organism in one operation. Thus, agents to be entrained in the flow of superheated steam will typically be injected into flowline 50 after exiting; the steam generator 28.

The nozzle 20 is designed so that the superheated steam flowing out of the nozzle 20 provides for equal distribution of the discharged steam across the height of the nozzle exit and at a velocity sufficient to carry the superheated steam out to the desired distance and desired temperature without undue infusion of cooling ambient air. The temperature of the discharge from the superheated can be varied to elevate or lower the superheated stream temperature conditions and still achieve the desired temperature at the desired distance.

Figure 7:
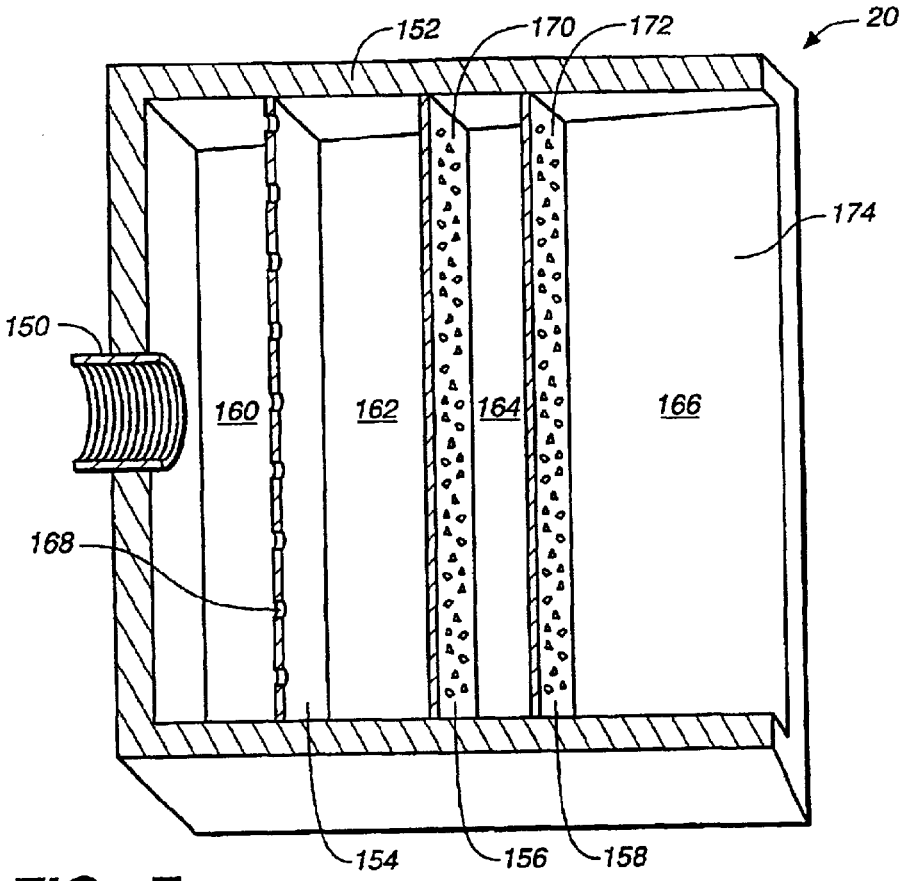
FIG. 7 shows a cross-sectional view of a nozzle as a means for distributing superheated steam as embodied in the invention.

Referring to FIG. 7, a cross-sectional view of the nozzle 20 is shown. The nozzle 20 comprises an inlet tube 150 for allowing superheated stream to flow into the outlet nozzle 20 from flowline 50. The outlet nozzle 20 further has a housing 152 having walls defining a space within which has been partitioned into four separate chambers by a manifold 154 and a pair of perforated baffles 156 and 158.

In operation, superheated steam enters the nozzle 20 into the first chamber 160 by way of the inlet tube 150. The first chamber 160 is defined as the space bounded by the walls of the housing 152 and the manifold 154. The manifold 154 has a series of orifices 168, preferably equally spaced along the manifold, to allow equal distribution of superheated steam to flow from the fiat chamber 160 to the second chamber 162.

The second chamber 162 is defined as the space bounded by the manifold 154, the housing 152 and the first perforated baffle 156. Superheated steam entering into the second chamber subsequently flows into the third chamber by way of perforations 170 on the first perforated baffle 156. The perforations 170 on the first perforated baffle 156 are preferably spaced throughout the entire surface of the first perforated baffle 156 to allow equal distribution of superheated stream to flow into the third chamber.

The third chamber 164 is defined as the space bounded by the first perforated baffle 156, the housing 152 and the second perforated baffle 158. Perforation 172 on the second perforated baffle 158 are similar to that of the first separated baffle 156 so to allow equal distribution of superheated steam to flow into the exiting chamber 166.

The exiting chamber is defined as the space bounded by the second perforated baffle 158 and the housing 152, and has an opening 174 at one end where superheated steam flows out of the nozzle 20 where it is applied to the desired foliage 2. The sizes of the orifices 168, the perforations 170 and 172, and the opening 174 allow for the desired BTU release, temperature and velocity of the treating superheated steam.

In defoliation applications of the superheated steam delivery apparatus 10 for grape vines, the nozzle 20 preferably tracks on the vine 2 in such a way that the superheated steam of approximately 250° F. to 500° F. envelopes the vine 2 at the desired distance. Thus, it is desirable to connect the nozzle 20 so that it can easily move in and out to track the vine 2 at the desired distance from the vine. Therefore, in a preferred embodiment, all connecting lines of the superheated steam delivery apparatus 10 are flexible; this includes the water lines 34 and 36, the steam lines 42, 44 and 50, the power lines 38 and 48, and the fuel fines 40 and 46.

So that the nozzle 20 may be easily positioned for treating the foliage 2, the use of hydraulic sensing or mechanical sensing to move the nozzle in and out can be employed. For example, a parallel link arm assembly holding a ski along the vine trunk to correctly position the nozzle can be used. Such an assembly is known to the art in connection with grape harvesters.

Returning to FIG. 1, the nozzle 20 is illustrated for selectively delivery of superheated steam above the soil, such as adjacent to leaves of above-ground plants; however, as already described, superheated steam can be used to kill undesired organisms such as weeds on the surface of the soil or undesirable nematodes within the soil. When killing weeds above ground, one can position nozzle 20 several inches above the soil surface and permit the superheated steam to be delivered adjacent to the soil surface. Post-emergent weed control in accordance with the invention has experimentally demonstrated with such recalcitrant weeds as Bermuda grass and morning glory. Surface rhizomes and seeds of these weeds were also killed or their ability to grow retarded.

Figure 8:
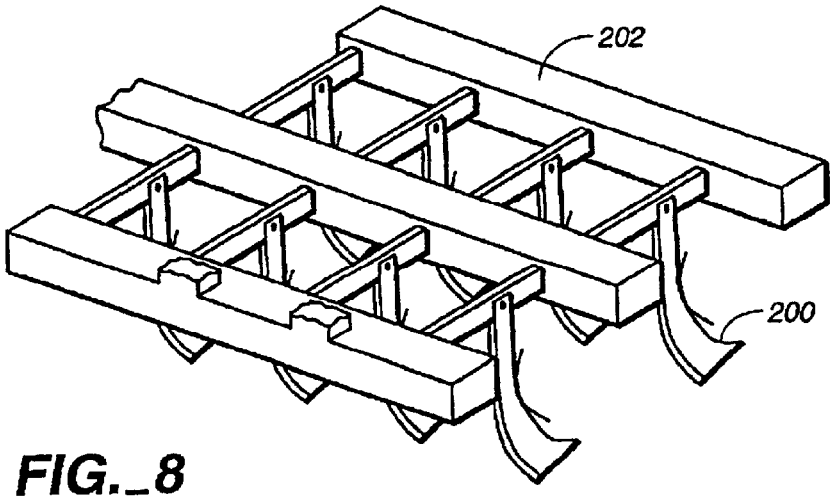
FIG. 8 shows a perspective view of knives as another means for distributing superheated steam as embodied in the invention.

Turning to FIG. 8 where the inventive apparatus is used to kill insects or their larvae within soil, then the apparatus can include another means for distributing superheated steam, such as a plurality of knives 200 mounted on a bar 202 and spaced from each other, such as by a four inch spacing. Bar 202 as illustrated may be a standard A-frame toolbar conventionally known and used with apparatus such as a cultivator and fertilizer side dressing sled. These knives can be drawn through soil to a depth, for example, of about 24 inches, while emitting superheated steam delivered through a tube to orifices (not illustrated) along one side of the knives. More shallow injections than a depth of 24 inches, of course, may be found suitable, and the spacing between the knives may be adjusted as desired. For example, strawberry beds would typically only need soil penetration and superheated steam injection in a range of about two inches to about ten inches, although for fumigating applications in general one may wish to penetrate the soil and inject superheated steam in a range of about 2 inches to about 20 inches.

By increasing the temperature at which the superheated steam is selectively delivered to in the field plants, one can also increase efficiency for fruits intended to dry (or partially dry) in the field before harvest, e.g. prune plums and raisin grapes. For example, by contrast to use of superheated steam in grape vine defoliation where damage to the young grape berries must be avoided, one can selectively deliver higher temperature superheated steam, usually more slowly, to raisin grapes to assist them in drying. In such a drying application, one preferably entrains a drying aid (such as methyl or ethyl oleate) in the flow of superheated steamy which assists in moisture evaporation across the usual waxy barrier on the fruit's skin.

Aspects of the invention will now be illustrated by the following examples which are intended to illustrate but not limit the invention.

EXAMPLE 1

A prototype of the superheated steam apparatus as described for grape defoliation was pulled by a tractor moving about 1–2 miles per hour through grape vine rows spaced 12 feet apart. With a 300 gallon water reservoir, superheated steam was applied to about 1–2 acres per hour. Within minutes of application, the treated leaves shriveled. The leaves were dry within an hour, followed by leave drop over the next several days. Further, leave hoppers on those directly treated leaves and adjacent leaves were killed and observed to have fallen from the growing vines; however, the developing grape berries were not harmed at all.

EXAMPLE 2

The top four inches of a worked soil bed had superheated steam applied. Samples of the soil were then inspected and were shown to be substantially sterilized.

EXAMPLE 3

The prototype of the superheated steam apparatus had the steam nozzle :placed facing down to the row berm of orchard and vineyard rows at a distance 2 inches to 3 inches above the ground and was moved parallel to the ground at between ¼ mph and 1½ mph, depending upon the amount of vegetation to be killed. The superheated steam that was so delivered was in a temperature range of 500° F.–700° F. which was effective to kill the growing weeds and to keep most of the weed seeds that had dropped from germinating.

EXAMPLE 4

Methyl oleate and ethyl oleate are known and used to assist in speeding moisture evaporation through the waxy film that naturally occurs on the skin of fruits such as raisin grapes and prune plums. In an application of superheated steam for grape defoliation as described by Example 1, an additional operation was simultaneously performed by injecting Methyl oleate or ethyl oleate into the flowline 50 before the superheated steam flowed into nozzle 20. In this instance, the prototype had dual nozzles and a flow divisional valve controlled the superheated steam flow to the, right or left nozzle. The superheated steam, which included methyl- or ethyl oleate, was thus applied to raisin grapes in conjunction to removal prior to harvest. This permitted more rapid moisture evaporation through the grape skin surfaces.

It is to be understood that while the invention has been described above in conjunction with preferred specific embodiments, the description and examples are intended to illustrate and not limit the scope of the invention, which is defined by the scope of the appended claims.

It is claimed:

1. An agricultural method for in the field use, comprising:

generating steam in a first steam generator, the steam having water droplets therein;

removing substantially all the water droplets from the steam so as to form saturated steam substantially free of water droplets;

heating the [supersaturated] *saturated* steam to at least about 300° F. in a second steam generator to form superheated steam; and, selectively delivering sufficient of the superheated steam to soil in a field to kill undesired organisms.

2. The method as in claim 1 wherein the superheated steam is delivered at a temperature above about 250° F.

3. The method as in claim 1 wherein the selective delivery includes penetrating the soil to a depth in a range of about two inches to about twenty inches to deliver the superheated steam therein.

4. The method as in claim 2 wherein the undesired organisms are weeds.

5. The method as in claim 2 wherein the undesired organisms are insects or worms.

6. The method as in claim 2 further comprising turning over an upper soil layer while selectively delivering the superheated steam thereto.

7. The method as in claim 1 wherein the undesired organisms are nematodes.

8. The method as in claim 3 wherein the selective delivery is prior to planting a crop.

9. A preplant treatment method for fields, comprising:

generating steam in a first steam generator, the steam having water droplets therein;

removing substantially all the water droplets from the steam so as to form saturated steam substantially free of water droplets;

heating the [supersaturated] *saturated* steam to at least about 300° F. in a second steam generator to form superheated steam; and, selectively delivering sufficient of the superheated steam to soil in the field prior to planting to kill nematodes therein, the superheated steam being delivered at a temperature above 250° F.

10. The preplant treatment method as in claim 9 wherein the field is for planting strawberries.

11. A method for defoliating grape vines comprising:

generating a flow of superheated steam; and[.]

delivering the flow of superheated steam to basal leaves adjacent to developing grape berries.

12. The method as in claim 11 wherein the superheated steam delivered contacts the basal leaves and is in a temperature range of about 250° F. to about 500° F.

13. The method as in claim 11 wherein the flow of superheated steam is generated to be from about 300° F. to about 800° F. and is at a pressure of from about 5 psi to about 60 psi.

14. The method as in claim 11 wherein the superheated steam is substantially free of water droplets.

15. The method as in claim 11 wherein the generation of flow of superheated steam includes initially forming steam in a first steam generator followed by generating superheated steam in a second steam generator, wherein water droplets in the steam from the first steam generator are substantially removed before treatment in the second steam generator.

16. A method for treating raisin grapes or prune plums in the field, comprising:

generating a flow of superheated steam, the superheated steam having a drying adjuvant entrained therein; and, delivering the flow of superheated steam to the raisin grapes or prune plums.

17. The method as in claim 16 wherein the adjuvant is methyl oleate or ethyl oleate.

18. The method as in claim 16 wherein the flow of superheated steam delivered is effective to increase moisture evaporation from the raisin grapes or prune plums.

*19. An agricultural method comprising:*

*generating a flow of superheated steam in which substantially all of the water droplets are removed from the steam prior to generating said superheated steam; and*

*delivering the flow of superheated steam to a plant having a graft, where said delivering is sufficient to inhibit a growth of suckers or canes on said plant.*

*20. The method of claim 19, wherein said plant is a fruit plant.*

*21. The method of claim 19, wherein said plant is a cotton plant.*

*22. The method of claim 19, wherein said plant is a vine, a tree, or a shrub.*

*23. The method of claim 22, wherein said vine is a grape vine.*

*24. The method of claim 22, wherein said tree is a nut tree.*

*25. The method of claim 19, wherein said delivering delivers said flow adjacent to said graft.*

*26. The method of claim 19, wherein said delivering delivers said flow to the root stock of said graft.*

*27. The agricultural method of claim 19, wherein said generating said flow of superheated steam includes:*

*generating steam in a first steam generator, the steam having water droplets therein;*

*removing substantially all the water droplets from the steam so as to form a steam substantially free of water droplets; and*

*heating the steam substantially free of water droplets to at least about 300° F. in a second steam generator to form said superheated steam.*

*28. An agricultural method comprising:*

*generating a flow of superheated steam in which substantially all of the water droplets are removed from the steam prior to generating said superheated steam; and*

*delivering the flow of superheated steam adjacent to a graft sufficient to inhibit a growth adjacent to said graft.*

*29. The method of claim 28, wherein said graft is the graft of a fruit plant.*

*30. The method of claim 28, wherein said graft is the graft of a cotton plant.*

*31. The method of claim 28, wherein said graft is the graft of a vine, a tree, or a shrub.*

*32. The method of claim 31, wherein said vine is a grape vine.*

*33. The method of claim 31, wherein said tree is a nut tree.*

*34. The method of claim 28, wherein said growth is a leaf, a sucker or a cane.*

*35. The agricultural method of claim 28, wherein said generating said flow of superheated steam includes:*

*generating steam in a first steam generator, the steam having water droplets therein;*

*removing substantially all the water droplets from the steam so as to form a steam substantially free of water droplets; and*

*heating the steam substantially free of water droplets to at least about 300° F. in a second steam generator to form said superheated steam.*

*36. An agricultural method comprising;*

*generating a flow of superheated steam in which substantially all of the water droplets are removed from the steam prior to generating said superheated steam; and*

*delivering the flow of superheated steam to a plant sufficient to fumigate said plant.*

*37. The method of claim 36, wherein said plant is a fruit plant.*

*38. The method of claim 36, wherein said plant is a cotton plant.*

*39. The method of claim 36, wherein said plant is a vine, a tree, or a shrub.*

*40. The method of claim 39, wherein, said vine is a grape vine.*

*41. The method of claim 39, wherein said tree is a nut tree.*

*42. The agricultural method of claim 36, wherein said generating said flow of superheated steam includes:*

*generating steam in a first steam generator, the steam having water droplets therein;*

*removing substantially all the water droplets from the steam so as to form saturated steam substantially free of water droplets; and*

*heating the steam to at least about 300° F. in a second steam generator to form said superheated steam.*

* * * * *